(12) United States Patent
Neau

(10) Patent No.: US 12,350,971 B2
(45) Date of Patent: Jul. 8, 2025

(54) TIRE TREAD FOR A HEAVY-DUTY VEHICLE HAVING IMPROVED RESISTANCE TO ATTACK

(71) Applicant: COMPAGNIE GENERALE DES ETABLISSEMENTS MICHELIN, Clermont-Ferrand (FR)

(72) Inventor: Xavier Neau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/038,918

(22) PCT Filed: Nov. 19, 2021

(86) PCT No.: PCT/FR2021/052039
§ 371 (c)(1),
(2) Date: May 25, 2023

(87) PCT Pub. No.: WO2022/112689
PCT Pub. Date: Jun. 2, 2022

(65) Prior Publication Data
US 2024/0092126 A1 Mar. 21, 2024

(30) Foreign Application Priority Data
Nov. 27, 2020 (FR) ...................................... 2012247

(51) Int. Cl.
*B60C 11/12* (2006.01)
*B60C 11/03* (2006.01)

(52) U.S. Cl.
CPC ........ *B60C 11/125* (2013.01); *B60C 11/0323* (2013.01); *B60C 11/1281* (2013.01); *B60C 2200/06* (2013.01)

(58) Field of Classification Search
CPC ............. B60C 11/1281; B60C 2200/06; B60C 2200/065
See application file for complete search history.

(56) References Cited

U.S. PATENT DOCUMENTS 3,556,190 A 1/1971 Riches
2012/0227883 A1* 9/2012 Audigier ............. B60C 11/0309
152/209.18
2021/0155051 A1* 5/2021 Zivkovic ............. B60C 11/0323

FOREIGN PATENT DOCUMENTS

EP 0206227 12/1986
FR 1568434 5/1969
(Continued)

*Primary Examiner* — Katelyn W Smith
*Assistant Examiner* — Nicholas J Weiler
(74) *Attorney, Agent, or Firm* — COZEN O'CONNOR

(57) ABSTRACT

A tire tread (1) for a heavy-duty vehicle to improve resistance to attack by stones. The tread (1) in the new state having at least one complex cut (5) with, along a mean line (Lm), an alternation of external cavities (6), opening onto the tread surface (2), and internal cavities (7), not opening onto the tread surface (2), two consecutive cavities, respectively an external cavity (6) and an internal cavity (7), being connected to each other by a connecting channel (8) of non-zero length, the height (H11) of each external cavity (6) being at least equal to half the height (H) of the complex cut (5), the height (H3) of each connecting channel (8) being at most equal to one third of the height (H) of the complex cut (5).

14 Claims, 2 Drawing Sheets

(56) References Cited

FOREIGN PATENT DOCUMENTS

| WO | WO 2011/039194 | 4/2011 | |
|---|---|---|---|
| WO | WO 2011/101495 | 8/2011 | |
| WO | WO 2012/130735 | 10/2012 | |
| WO | WO 2016/188956 | 12/2016 | |
| WO | WO 2017/176280 | 10/2017 | |
| WO | WO 2019/008276 | 1/2019 | |
| WO | WO 2019/122677 | 6/2019 | |
| WO | WO-2019122677 A1 * | 6/2019 | ......... B60C 11/0323 |

* cited by examiner

TIRE TREAD FOR A HEAVY-DUTY VEHICLE HAVING IMPROVED RESISTANCE TO ATTACK

RELATED APPLICATIONS

This is a U.S. National Phase Application under 35 USC 371 of International Application PCT/FR2021/052039 filed on Nov. 19, 2021.

This application claims the priority of French application no. FR 2012247 filed Nov. 27, 2020, the entire content of all of which is hereby incorporated by reference.

FIELD OF THE INVENTION

The present invention relates to a tire tread for a heavy-duty vehicle, more particularly for a heavy-duty vehicle for mixed use, which is able to run both on roads, on tarmacked ground, and off-road, on stony ground.

BACKGROUND OF THE INVENTION

A tread, constituted by at least one rubber-based material, is the wearing part of the tire, situated at its periphery and intended to be worn away when it comes into contact with the ground via a tread surface. It usually comprises a tread pattern, which is a combination of cuts, or voids, and raised elements, of the block or rib type, and is intended primarily to ensure satisfactory performance in terms of grip, more particularly on a wet roadway.

As is known, the wet-weather running conditions of a vehicle, and more particularly those of a heavy-duty vehicle, require rapid evacuation of the water present in the contact patch between the tread and the roadway. This evacuation makes it possible to ensure that the material constituting the tread comes into direct contact with this roadway via the tread surface. The water that is not pushed ahead of or to the sides of the tire flows or is collected partially in the cuts formed in the tread.

The evacuation of the water is ensured by the cuts, which form a fluid flow network that needs to be effective throughout the duration of use of the tire, from its new state to its state of maximum wear. The state of maximum wear, which is set by the regulations in force, is the state of wear beyond which the tire needs to be removed from the vehicle for safety reasons.

More specifically, the cuts allowing the evacuation of water are essentially wide cuts called grooves. A groove has a width such that the facing walls of material that delimit it do not come into contact with one another when the tread enters the contact patch, when the tire is subjected to recommended inflation and load conditions as are defined in particular by the European standards of the "European Tire and Rim Technical Organization" or "E.T.R.T.O." in its "Standards Manual 2020—Commercial Vehicle Tires". The deformations in compression and in shear of the raised elements delimiting the groove govern the pressures in the contact patch in which contact is made with the ground and therefore the wear. In addition, these deformations, by generating hysteresis losses in the material of the tread, impact the rolling resistance, and therefore the fuel consumption of the vehicle.

A tread may also comprise narrow cuts or sipes. A sipe has a width such that the facing walls of material that delimit it come into contact with one another at least partially when the tread enters the contact patch, under the tire load and pressure conditions specified by the E.T.R.T.O. and set out above. A sipe does not make it possible to evacuate the water, but, with respect to the grip, has an edge corner effect in the contact patch in which contact is made with the ground, which makes it possible in particular to break a film of water that may be present on the ground.

To limit the reduction in the volume of material to be worn away of the tread that results from the presence of grooves and sipes, so-called complex cuts have been proposed, which make it possible, compared with normal cuts, which are completely open onto the tread surface, to increase the volume of material of the tread while complying with the void volume for storage of water above a given threshold, regardless of the level of wear of the tire.

Treads comprising such complex cuts have been described in particular in the documents WO 2011039194, WO 2011101495, WO 2012130735, WO 2016188956, WO 2019008276 and WO 2019122677. A complex cut opens onto the tread surface in a discontinuous manner, at a regular or irregular spacing, when new. Each complex cut has external cavities, which are open onto the tread surface and are separated from one another in the main direction of the complex cut. The main direction of the complex cut corresponds generally to the direction in which water flows in said cut when running on ground covered in water. This complex cut comprises, besides the external cavities, internal cavities formed inside the tread and generally connected to the tread surface by sipes. These internal cavities are positioned radially and entirely on the inside of the tread surface in the new state, and are interposed between the external cavities. The internal cavities may be positioned at different depth levels in the thickness of the tread. Furthermore, the continuity of the flow of water in each complex cut, in the new state, is ensured by connecting portions, generally connecting channels, between two consecutive cavities, respectively an external cavity and an internal cavity. The assembly constituted by the external cavities, the internal cavities and the connecting channels thus forms a continuous groove. By contrast, the juxtaposition of internal and external cavities that are not connected to each other and therefore do not allow fluid to flow from one to the other around the entire circumference of the tire does not constitute a continuous groove.

For a tread having complex cuts, the volume of all of the internal cavities, external cavities and connecting channels is reduced compared with that of grooves that are completely open onto the tread surface when new and have a depth corresponding to the maximum depth of the internal or external cavities. The presence of complex cuts thus makes it possible to limit the reduction in stiffness of the tread in the new state that is associated with the presence of the grooves.

A tread pattern may have both complex cuts, opening intermittently onto the tread surface, and conventional grooves, opening onto the tread surface along their entire length.

When the tire is running on stony ground, its tread is likely to retain stones in its cuts, and in particular in its grooves. These stones retained by the grooves of the tread are then likely to create perforations in the tread, which can cause damage to the crown reinforcement of the tire, which is radially on the inside of the tread, and, ultimately, breakage of said crown reinforcement rendering the tire unusable.

This stone retention phenomenon can be particularly marked in the case of complex cuts. Specifically, these can capture stones at their external cavities, these stones being likely to remain trapped, more particularly, in the connecting channels between the respectively external and internal cavities, and therefore to cause damage to the tread.

SUMMARY OF THE INVENTION

Thus, the inventors have set themselves the objective of improving the resistance to attack by stones of a tread for a heavy-duty vehicle, comprising complex cuts constituted by an alternation of external cavities, internal cavities and connecting channels between external cavities and internal cavities.

This objective has been achieved by a tire tread for a heavy-duty vehicle, intended to come into contact with the ground via a tread surface, comprising cuts delimiting raised elements,
  the tread in the new state comprising at least one complex cut comprising, along a mean line, an alternation of external cavities, opening onto the tread surface, and internal cavities, not opening onto the tread surface, two consecutive cavities, respectively an external cavity and an internal cavity, being connected to each other by a connecting channel,
  each external cavity having, in a mean surface containing the mean line and a radial direction perpendicular to the tread surface, a height, measured, in the radial direction, between the tread surface and an external cavity bottom, and a length, measured, along the mean line, at the tread surface,
  each internal cavity having, in the mean surface, a height, measured, in the radial direction, between an internal cavity top and an internal cavity bottom radially on the inside of the external cavity bottom, and a length, measured, along the mean line, at the bottom of the internal cavity,
  each connecting channel having, in the mean surface, a height, measured, in the radial direction, between a connecting channel top and a connecting channel bottom, at the circumferential join between the external cavity and the connecting channel, and a length, measured, along the mean line, between the external cavity and the internal cavity, which is non-zero,
  each complex cut having, in the mean surface, a height, measured, in the radial direction, between the tread surface and the internal cavity bottom,
  the height of each external cavity being at least equal to half the height of the complex cut,
  the height of each connecting channel being at most equal to one third of the height of the complex cut.

The invention therefore relates to a tread comprising at least one complex cut constituted, along a mean line, by an alternation of external cavities, opening onto the tread surface, and internal cavities, not opening onto the tread surface, two consecutive cavities, respectively an external cavity and an internal cavity, being connected to each other by a connecting channel ensuring a gradual transition between said cavities, respectively an external cavity and an internal cavity.

The mean line of the complex cut is not necessarily rectilinear, and may have, by way of example, a wavy shape or a zigzag shape. In addition, it can extend in any direction: longitudinal, transverse or oblique. By convention, the longitudinal direction is the direction of the greatest dimension or length of the tread, the transverse direction is the direction of the intermediate dimension or width of the tread, and the radial direction is the direction of the smallest dimension or thickness of the tread. An oblique direction has an intermediate overall orientation between the longitudinal direction and the transverse direction. An oblique direction is said to be substantially longitudinal when it forms an angle at most equal to 45° with the longitudinal direction, and substantially transverse when it forms an angle at most equal to 45° with the transverse direction.

The complex cut forms, in a section on a mean surface defined by its mean line and a radial direction perpendicular to the tread surface, a continuous wavy groove comprising an alternation of external cavities, internal cavities and connecting channels between two consecutive cavities, respectively an external cavity and an internal cavity. In other words, two consecutive external cavities along the mean line are separated by a single internal cavity and vice versa. As a result of the undulation of the complex cut in the circumferential direction, in the thickness of the tread, the bottom of any internal cavity is radially on the inside of the bottom of an adjacent external cavity.

The respectively external and internal cavities, and the connecting channels, are characterized by their respective geometries defined in the mean surface of the complex cut, namely a height measured in the radial direction, in the thickness of the tread, and a length, measured along the mean line of the complex cut, between two references depending on the portion of complex cut under consideration. The respective heights can be defined with respect to the height of the complex cut, measured between the tread surface in the new state, onto which the external cavities open, and a bottom surface passing through the bottom of the internal cavities, i.e. the radially innermost points of the complex cut. In the context of the invention, the height of each external cavity is at least equal to half the height of the complex cut, and this ensures a sufficient external cavity volume, necessary for the storage of water on wet ground, when the tread is in the new state. Furthermore, the length of any connecting channel is non-zero, and this ensures a gradual transition between the cavities, respectively an external cavity and an internal cavity, connected by said connecting channel.

An essential feature of the invention is to limit the height of the connecting channel, measured at the connection of the channel with the external cavity, in other words at its section opening into the external cavity. According to the invention, this height is optimized to prevent the passage of stones of excessive size, i.e. of a dimension such that they would be likely to cause significant damage to the crown of the tire. The inventors have estimated a critical stone size characterized by a diameter greater than one third of the height of the complex cut, hence a height of the connecting channel at its connection with the external cavity that is at most equal to one third of the height of the complex cut.

Preferentially, the height of each connecting channel is at least equal to one tenth of the height of the complex cut. Below this value, the flow rate of water in the complex cut becomes insufficient to ensure sufficient grip of the tread on a wet road surface, due to excessive striction of the complex cut at the connecting channel.

Again advantageously, the height of each external cavity is at most equal to three quarters of the height of the complex cut. This maximum external cavity height ensures the presence, radially on the inside of the external cavity, of a thickness of rubber-based material that is sufficient to ensure the protection of the crown reinforcement portion radially positioned on the inside of the tread, vertically in line with the external cavity.

Advantageously, the length of each connecting channel is at least equal to the height of the connecting channel. The connecting channel is effective for trapping the stones captured by the external cavity to which it is connected, if it is long enough, i.e. if it provides striction over a sufficient distance.

Advantageously, the height of each internal cavity is at least equal to one third of the height of the complex cut. This minimum internal cavity height ensures a sufficient external cavity volume, necessary for the storage of water on wet ground, when the tread reaches a level of wear corresponding to the internal cavity top, in other words when the cavity internal in turn opens onto the tread surface in the worn state.

Again advantageously, the height of each internal cavity is at most equal to three quarters of the height of the complex cut. This maximum internal cavity height ensures the presence, radially on the outside of the internal cavity, of a thickness of rubber-based material that is sufficient to ensure, in the new state, the protection of the crown reinforcement portion radially positioned on the inside of the tread, vertically in line with the internal cavity.

The ratio between the length of the internal cavity and the length of the external cavity is advantageously at least equal to 0.8. Below this value, the external cavity length becomes excessive and negatively impacts the volume of material to be worn away.

The ratio between the length of the internal cavity and the length of the external cavity is again advantageously at most equal to 1.5, preferably at most equal to 1.2. Above this value, the external cavity length becomes insufficient to ensure good collection of the water present on the ground.

According to a preferred embodiment variant of the internal cavities, each internal cavity has an internal cavity top extended radially outwards by a sipe as far as the tread surface, due to a technological constraint of manufacturing the external cavities by moulding from the outside of the tread.

According to an embodiment variant of the external cavities, each external cavity has an external cavity bottom extended radially inwards by at least one sipe as far as, at most, a bottom surface passing through the internal cavity bottom. When the level of wear of the tread reaches the bottom of the external cavity, at least one sipe then appears that will contribute to grip, in particular on wet ground, by creating an edge corner effect that makes it possible to break the film of water that is present on the ground.

According to a preferred embodiment of the tread, the mean line of at least one complex cut is substantially longitudinal, forming at any point an angle at most equal to 45°, preferably at most equal to 20°, with respect to a longitudinal direction of the tread. In other words, this mean line is preferentially oriented in a longitudinal direction, which is the direction of forward travel of the tire and the main direction of flow of the water evacuated in the contact patch in which contact is made with the ground.

According to a variant of the preferred embodiment of the tread, at least one complex cut having a substantially longitudinal mean line is axially positioned in a median portion of the tread having an axial width at most equal to two thirds of the axial width of the tread, said median portion being centred on a median plane passing through the middle of the tread surface and perpendicular to the tread surface. The axial width of the tread is the axial distance between the axial ends of the tread surface, when the tire is inflated and compressed under the pressure and load conditions recommended by the standards of the E.T.R.T.O. The advantage of having a complex cut in the median portion of the tread, compared with a conventional groove, is to reduce the surface area of the cut that opens onto the tread surface, and therefore the risk of capturing stones, it being known that this median portion, which is characterized by a distribution of high contact pressures, has a great ability to capture stones. Specifically, this central portion is characterized by a large meridian radius, therefore by a relatively flat external profile not allowing a hinge effect that is able to release the stones captured on the roadway. In addition, it corresponds to a portion of high stiffness of the crown of the tire.

The invention also relates to a tire for a heavy-duty vehicle, comprising a tread according to any one of the embodiments described above.

BRIEF DESCRIPTION OF THE DRAWINGS

The features of the invention are illustrated by the schematic FIGS. 1 and 2, which are not drawn to scale.

DETAILED DESCRIPTION OF THE DRAWINGS

Figure 1:
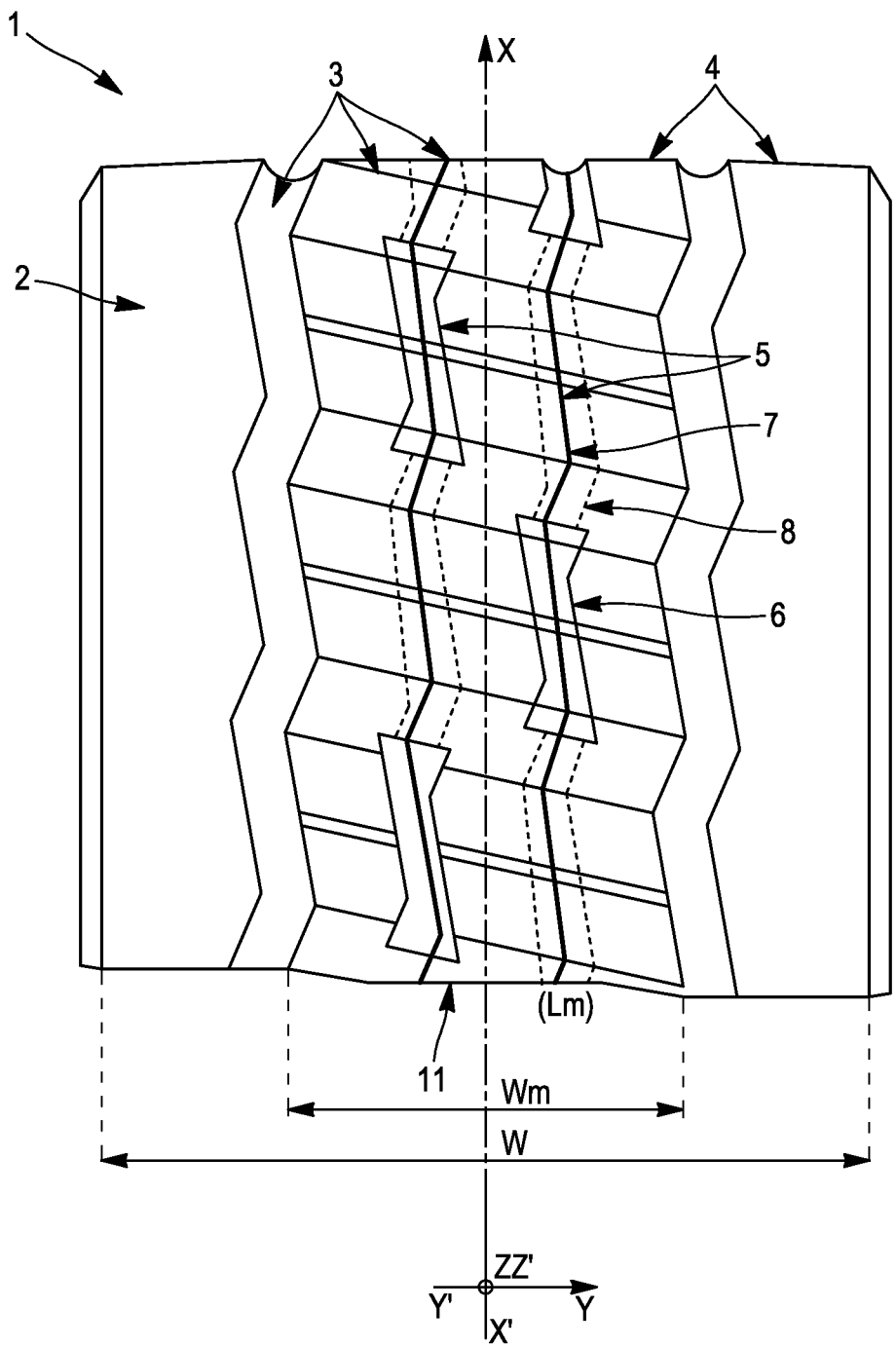
FIG. 1: View from above of a tread according to the invention in the new state.

FIG. 1 is a view from above of a tread 1 according to the invention in the new state. The tire tread 1, which is intended to come into contact with the ground via a tread surface 2, comprises cuts 3, which delimit raised elements 4. Among the cuts 3 shown, there are distinguished two substantially longitudinal grooves, each delimiting a lateral rib and a median portion 11, said median portion 11 having, in a transverse direction YY' of the tread, an axial width Wm at most equal to two thirds of the axial width W of the tread. The median portion 11 further comprises two substantially longitudinal complex cuts 5, each separating two longitudinal rows of raised elements 4 of the block type separated in pairs by sipes. Each complex cut 5 comprises, along a mean line Lm, an alternation of external cavities 6, opening onto the tread surface 2, and internal cavities 7, not opening onto the tread surface 2, two consecutive cavities, respectively an external cavity 6 and an internal cavity 7, being connected to each other by a connecting channel 8. The internal cavities 7 and the connecting channels 8, which are not visible when the tread is the new state, are shown in dashed lines. In the embodiment shown, the mean line Lm of each complex cut 5 has a substantially longitudinal zigzag shape, with a tangent at any point forming, with a longitudinal direction XX' of the tread, an angle at most equal to 45°, preferably at most equal to 20°.

Figure 2:
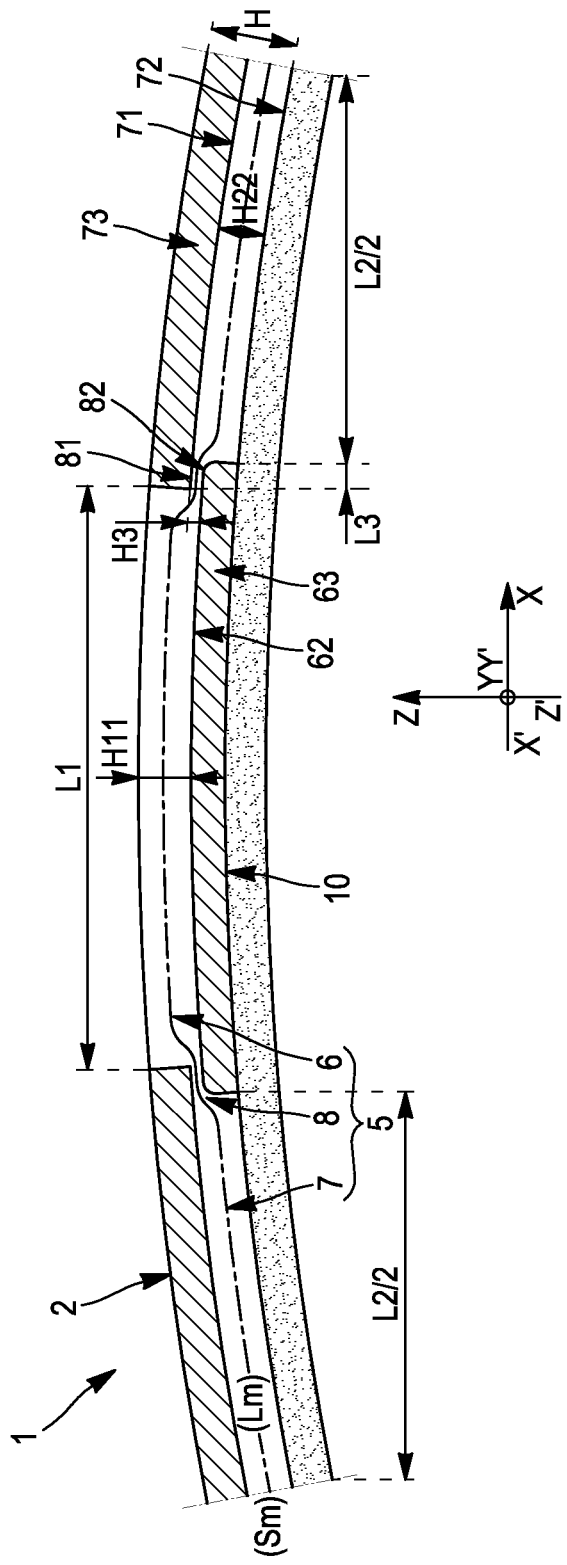
FIG. 2: View in section, on a complex cut mean surface, of a portion of complex cut comprising an external cavity, an internal cavity and a connecting channel connecting them.

FIG. 2 is a view in section on a complex cut mean surface Sm, of a portion of complex cut 5 comprising an external cavity 6 connected at each of its ends to an internal cavity 7 by a connecting channel 8. Only an internal half-cavity 7 is shown at each end of the external cavity 6. The external cavity 6 has, in a mean surface Sm containing the mean line Lm and a radial direction ZZ' perpendicular to the tread surface 2 of the tread 1, a height H11, measured, in the radial direction ZZ', between the tread surface 2 and an external cavity bottom 62, and a length L1, measured, along the mean line Lm, at the tread surface 2. Each internal cavity 7 has, in the mean surface Sm, a height H22, measured, in the radial direction ZZ', between an internal cavity top 71 and an internal cavity bottom 72 radially on the inside of the external cavity bottom 62, and a length L2, measured, along the mean line Lm, at the bottom of the internal cavity 72. FIG. 2 shows two internal half-cavities 7 of length L2/2. Each connecting channel 8 has, in the mean surface Sm, a height H3, measured, in the radial direction ZZ', between a connecting channel top 81 and a connecting channel bottom 82, at the circumferential join between the external cavity 6 and the connecting channel 8, and a length L3, measured, along the mean line Lm, between the external cavity 6 and the internal cavity 7, which is non-zero. Furthermore, each complex cut 5 has, in the mean surface Sm, a height H, measured, in the radial direction ZZ', between the tread surface 2 and the internal cavity bottom 72. The height H11 of each external cavity 6 is at least equal to half the height H of the complex cut 5. In accordance with the invention, the height H3 of each connecting channel 8 is at most equal to one third of the height H of the complex cut 5. In the embodiment shown, the external cavity 6 has an external cavity bottom 62 extended radially inwards by a sipe 63 as far as a bottom surface 10 passing through the internal cavity bottom 72. In addition, each internal cavity 7 has an internal cavity top 71 extended radially outwards by a sipe 73 as far as the tread surface 2.

The inventors have more particularly studied this invention for a tire of size 13 R 22.5 intended to be fitted to a steering axle for a heavy-duty vehicle for mixed use and to bear a load equal to 4000 kg with an inflation pressure equal to 8.75 bar, according to the "Standards Manual 2020" of the E.T.R.T.O. standard.

Table 1 below shows the characteristics of the tread that was tested:

TABLE 1

| Characteristics | Values | Comments |
| --- | --- | --- |
| Height H of a complex cut | 17.5 mm | |
| Height H11 of external cavity | 11.5 mm | At least equal to H/2 = 8.8 mm and at most equal to 3*H/4 = 13.1 mm |
| Length L1 of external cavity | 71 mm | |
| Height H22 of internal cavity | 9 mm | At least equal to H/3 = 5.8 mm and at most equal to 3*H/4 = 13.1 mm |
| Length L2 of internal cavity | 83 mm | |
| Height H3 of connecting channel | 3 mm | At most equal to H/3 = 5.8 mm and at least equal to H/10 = 1.8 mm |
| Length L3 of connecting channel | 6 mm | |
| Ratio L2/L1 | 1.17 | At least equal to 0.8 and at most equal to 1.5 |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread for a heavy-duty vehicle, intended to come into contact with the ground via a tread surface, comprising cuts delimiting raised elements, the tread in the new state comprising at least one complex cut comprising, along a mean line (Lm), an alternation of external cavities, opening onto the tread surface, and internal cavities, not opening onto the tread surface, two consecutive cavities, respectively an external cavity and an internal cavity, being connected to each other by a connecting channel, each external cavity having, in a mean surface (Sm) containing the mean line (Lm) and a radial direction (ZZ') perpendicular to the tread surface, a height (H11), measured, in the radial direction (ZZ'), between the tread surface and an external cavity bottom, and a length (L1), measured, along the mean line (Lm), at the tread surface, each internal cavity having, in the mean surface (Sm), a height (H22), measured, in the radial direction (ZZ'), between an internal cavity top and an internal cavity bottom radially on the inside of the external cavity bottom, and a length (L2), measured, along the mean line (Lm), at the bottom of the internal cavity, each connecting channel having, in the mean surface (Sm), a height (H3), measured, in the radial direction (ZZ'), between a connecting channel top, which is at a same radial position as the internal cavity top, and a connecting channel bottom, which is at a same radial position as the external cavity bottom, at the circumferential join between the external cavity and the connecting channel, and a length (L3), measured, along the mean line (Lm), between the external cavity and the internal cavity, which is non-zero, each complex cut having, in the mean surface (Sm), a height (H), measured, in the radial direction (ZZ'), between the tread surface and the internal cavity bottom, the height (H11) of each external cavity being at least equal to half the height (H) of the complex cut, wherein the height (H3) of each connecting channel is at most equal to one third of the height (H) of the complex cut, wherein an entire extent of the connecting channel top and the internal cavity top are at a same radial position.

2. The tread according to claim 1, wherein the height (H3) of each connecting channel is at least equal to one tenth of the height (H) of the complex cut.

3. The tread according to claim 1, wherein the height (H11) of each external cavity is at most equal to three quarters of the height (H) of the complex cut.

4. The tread according to claim 1, wherein the length (L3) of each connecting channel is at least equal to the height (H3) of the connecting channel.

5. The tread according to claim 1, wherein the height (H22) of each internal cavity is at least equal to one third of the height (H) of the complex cut.

6. The tread according to claim 1, wherein the height (H22) of each internal cavity is at most equal to three quarters of the height (H) of the complex cut.

7. The tread according to claim 1, wherein the ratio between the length (L2) of the internal cavity and the length (L1) of the external cavity is at least equal to 0.8.

8. The tread according to claim 1, wherein the ratio between the length (L2) of the internal cavity and the length (L1) of the external cavity is at most equal to 1.5.

9. The tread according to claim 1, wherein each internal cavity has an internal cavity top extended radially outwards by a sipe as far as the tread surface.

10. The tread according to claim 1, wherein each external cavity has an external cavity bottom extended radially inwards by at least one sipe as far as, at most, a bottom surface passing through the internal cavity bottom.

11. The tread according to claim 1, wherein the mean line (Lm) of at least one complex cut is substantially longitudinal, forming at any point an angle at most equal to 45°, with respect to a longitudinal direction (XX') of the tread.

12. The tread according to claim 11, having an axial width (W), wherein at least one complex cut having a substantially longitudinal mean line (Lm) is axially positioned in a median portion of the tread having an axial width (Wm) at most equal to two thirds of the axial width (W) of the tread, said median portion being centred on a median plane (XZ) passing through the middle of the tread surface and perpendicular to the tread surface.

13. A tire for a heavy-duty vehicle, comprising a tread according to claim 1.

14. The tread according to claim 1, wherein a transition wall between the external cavity bottom and the internal cavity bottom is substantially perpendicular to the tread surface.

* * * * *